United States Patent [19]

James

[11] 4,051,675
[45] Oct. 4, 1977

[54] DRIVES INCORPORATING VARIABLE FILLING FLUID COUPLINGS

[75] Inventor: Walter Hugh Knight James, London, England

[73] Assignee: Fluidrive Engineering Company Limited, Isleworth, England

[21] Appl. No.: 634,376

[22] Filed: Nov. 24, 1975

Related U.S. Application Data

[63] Continuation-in-part of Ser. No. 495,463, Aug. 7, 1974, abandoned.

[51] Int. Cl.² .............................................. F16D 33/00
[52] U.S. Cl. ........................................ 60/330; 60/357; 318/98; 310/92
[58] Field of Search ..................... 310/92, 94, 97, 101, 310/95; 318/98, 99; 60/347, 357, 365, 351, 330, 336

[56] References Cited

U.S. PATENT DOCUMENTS

| 3,245,220 | 4/1966 | Bilton | 60/336 |
| 3,662,418 | 5/1972 | Hamiya | 318/98 X |
| 3,919,844 | 11/1975 | Elderton | 60/330 |

FOREIGN PATENT DOCUMENTS

| 847,742 | 9/1960 | United Kingdom |
| 298,519 | 10/1928 | United Kingdom |

Primary Examiner—Donovan F. Duggan
Attorney, Agent, or Firm—Blanchard, Flynn, Thiel, Boutell & Tanis

[57] ABSTRACT

A fluid coupling, of the kind in which the filling of its working circuit is determined by a movable trimming scoop, is driven by an electric motor. The coupling output drives a high-inertia load such as a long, loaded conveyor belt. During start-up, filling control means for the coupling increases the coupling filling except when the transmitted torque, determined by sensing the motor current, exceeds a predetermined value. The movable scoop is then held stationary to hold the degree of filling of the coupling constant until the torque again drops below the predetermined value.

4 Claims, 1 Drawing Figure

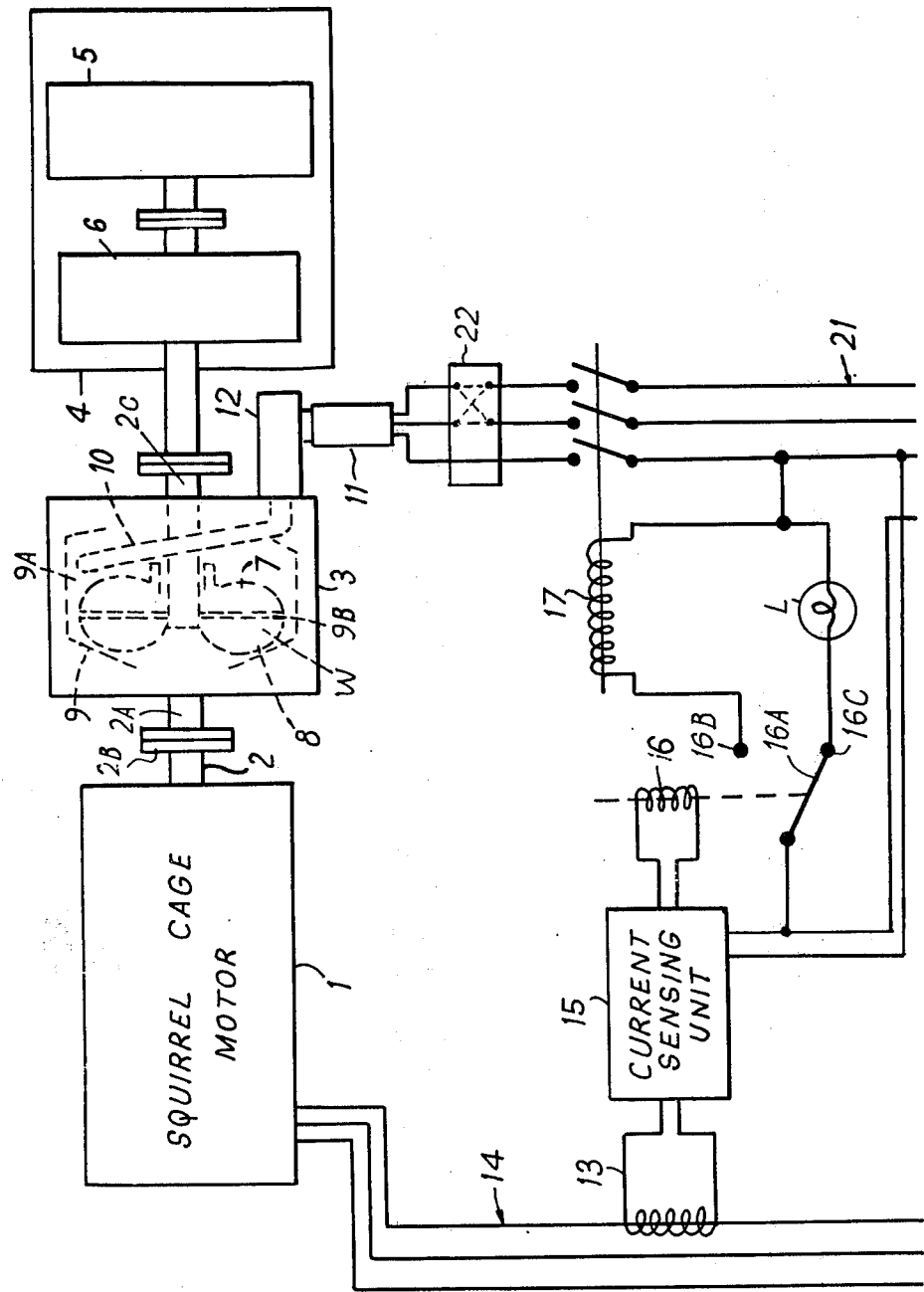

DRIVES INCORPORATING VARIABLE FILLING FLUID COUPLINGS

REFERENCE TO RELATED APPLICATION

This application is a Continuation-in-part of my Application Ser. No. 495,463 Filed: Aug. 7th, 1974, now abandoned.

BACKGROUND OF THE INVENTION

The present invention relates to load-accelerating drives incorporating variable-filling fluid couplings, and more particularly to variable-filling fluid coupling drive in which the accelerating torque imposed n a high inertia load at any instant during the acceleration from rest up to working speed does not exceed a predetermined value. One field in which such a requirement arises is to be found in drives for long conveyor belts. Such conveyor belts, which may be of several miles in length, are used for example for conveying minerals from a mine to a railhead or harbour. Considerable economies can be made in the capital cost of the conveyor belt by reducing the number of belt plies so that the belt will for example withstand forces up to but no more than say 50% greater than the normal operating values. To prevent damage to the belt, the belt drive must be prevented from exerting forces greater than 50% of the normal full load value. Another application where the same requirements apply would be a large fan where the application of excessive driving torques could cause damage to the fan. Furthermore, in the case of electric motor drives, limitation of the maximum torque applied to the load and thus of the maximum torque applied to the motor can prevent undue disturbance of the electrical network and can also prevent excessive voltage drop where the electric motor is situated in a remote location requiring long power lines.

PRIOR ART

British Patent Specification No. 847,742 (Twin Disc Clutch Company), published Sept. 14th, 1960, corresponding to U.S. Pat. No. 2,862,363 to James B. Black and Wilbur F. Shurts, issued Dec. 2nd, 1958, describes a drive for a conveyor belt in which a squirrel cage induction motor drives the conveyor through a variable-filling fluid coupling having a toroidal working circuit defined by dished and vaned rotary impeller and runner elements and a filling duct for supplying working liquid to the working circuit of the coupling. The working circuit has leak-off nozzles to permit the escape of liquid from the working circuit so as to create a cooling flow to remove heat from the coupling and also to allow the coupling to be emptied on cutting off the supply. On start-up, an electrical watt-meter monitors the electrical power taken by the induction motor and whenever this power exceeds a predetermined value, for example 130% of the normal full load power, a diverter valve switches the supply of working liquid away from the filling duct. The quantity of working liquid within the fluid coupling working circuit then decreases as liquid leaves through the leak-off nozzles. The power and torque transmitted by the coupling correspondingly falls away until the watt-meter causes the diverter valve to restore the supply to the working circuit.

With this known arrangement, variations in the torque/filling/slip characteristics of the coupling, cause a sudden temporary drop in the transmitted torque at some particular combination of percentage filling and percentage slip. This may be the result for example of a hydrodynamic instability of the liquid vortex in the working circuit. If the watt-meter should happen to reduce the filling into such a region of operation, the resulting low transmitted torque may be totally absorbed in overcoming frictional losses in the load with the result that no torque is available for acceleration and the load may never reach its intended speed even though the motor and the coupling may each be fully capable of driving the load at full speed.

Other filling control arrangements which were intended to be automatic but suffer from similar disadvantages are disclosed in British Patent Specifications Nos. 298,519 (Sinclair, October, 1928) and 378,754 (Sinclair, August, 1932).

BRIEF DESCRIPTION OF THE INVENTION

With the object of mitigating these disadvantages, the preferred embodiment of the invention includes a scoop-trimmed fluid coupling having a movable trimming scoop, the position of which determines the degree of filling the working circuit. Any excess of liquid above the amount determined by the position of the scoop is immediately trimmed off and removed by the scoop. On start-up, a driving motor runs up to speed and a filling control means begins to move the trimming scoop from an "empty" position, in which it has been keeping the coupling empty, towards the "full" position in which it maintains the coupling full and removes any excess of liquid supplied to the coupling, typically for removing heat generated by slip in the coupling. A torque-sensing device such as a current-meter in the supply to the motor causes a controller to halt the trimming scoop whenever the sensed torque exceeds a predetermined value. The coupling filling then remains constant, with the scoop stationary, until the sensed torque drops below the predetermined value and the controller resumes movement of the scoop towards the "full" position. Contrary to the teaching of the prior art, the degree of filling of the coupling is not reduced when an overload torque is sensed. This avoids hunting and reduces the risk of an excessive fall in the transmitted torque.

The said controller may act to switch on and off a small motor connected to drive the scoop progressively from its "circuit empty" to "circuit full" positions in one direction, through a suitable reduction gear box if required. This auxiliary motor could also be arranged to reverse the drive to the scoop so as to return it to the "circuit empty" position on shut down of the main drive.

BRIEF DESCRIPTION OF THE DRAWING

An embodiment of the invention will now be described by way of example, with reference to the accompanying drawing, in which the single figure is a schematic circuit diagram.

DETAILED DESCRIPTION OF EMBODIMENT

In the arrangement shown in the drawing, a three-phase high voltage high power squirrel cage motor 1 has its output shaft 2 connected by a flanged coupling 2B to the input shaft 2A of a scoop-trimmed fluid coupling 3. The output shaft 2C of coupling 3 is connected to the load 4 to be driven. In general, the load 4, for example a long conveyor belt, may be represented, and thus simulated for test purposes, by a flywheel 5 representing the inertia of the load and a friction brake 6 representing the power dissipated by the load as the result of friction, air resistance and like losses.

The fluid coupling 3 may be of the kind shown in U.S. Pat. No. 3,245,220 (J. Bilton, Apr., 12th 1966, but preferably is of the kind disclosed in U.S. Application Ser. No. 495,470, (J. Elderton, filed Aug. 7th, 1974), now U.S. Pat. No. 3,919,844. Such coupling includes an impeller 7 secured to an impeller casing 9 which defines therein a scoop chamber 9A. The impeller casing 9 is secured to the input shaft 2A. A runner element 8 is secured to the output shaft 2C. The impeller and runner elements 7 and 8 are vaned and together define a toroidal working circuit W therebetween for the working liquid of the coupling. The working circuit defined between the impeller and runner elements 7 and 8 is in free communication with the interior of the scoop chamber 9A through a gap 9B which exists between the impeller and runner elements 7 and 8 at their radially outer peripheries. The working fluid is delivered to the working circuit through internal passages in a conventional manner. The fluid coupling also has a conventional slidable trimming scoop tube 10 which extends into the scoop chamber 9A. Scoop tube 10 has an orifice at the free end thereof for trimming off the working liquid within the scoop chamber 9A to thereby control the amount of working fluid within the coupling. The fluid coupling has no leak-off nozzles. Accordingly, in known manner, the position of the scoop tube 10 determines the degree of filling of the working circuit W. The scoop 10 is movable over its whole range of positions by a small reversible motor 11 driving through a reduction gear box 12.

The torque in the shaft 2 of the motor 1 is approximately proportional to the current drawn by the motor 1. This current is measured by a current sensing unit made by Herbert-BSA Electrics Limited (catalogue J134/368), of Shaftmoor Lane, Birmingham, 28, England. This unit includes a current transformer comprising pickup coil 13 surrounding one of the leads of the three phase supply 14 to the motor 1 and forming with this lead a transformer. The ends of the coil 13 which thus forms the secondary winding of this transformer, are connected to a current sensing unit 15 which, when the current in the leads exceeds a predetermined value energizes a relay 16 which in turn de-energizes a motor controller 17 for the motor 11. The current sensing unit 15 is arranged to de-energize the relay 16 when the current in the leads 14 falls below the predetermined value, thereby re-energizing the controller 17 to start up the motor 11 again.

In operation, with the system at rest, the scoop tube 10 of the coupling 3 is in its "circuit empty" position. The motor 1 is switched on and runs rapidly up to its normal speed since the liquid working circuit W of the coupling 3 is empty.

The relatively low voltage supply 21 for the motor 11 and current sensing unit 15 is then switched on. Since the main motor 1 is running unloaded at full speed, it is drawing a low current. The current sensing unit 15 accordingly energizes the relay 16 to pull its movable contact 16A over to a fixed contact 16B to energize the motor controller 17 to in turn energize motor 11 to begin to draw the scoop tube 10 inwardly towards the coupling axis and thus in the direction towards the "circuit full" position, drawing the tip of the scoop out of the initial ring of liquid in the scoop chamber.

As a result, the working circuit W for the liquid begins to fill and the torque load imposed on the motor 1 rises. Correspondingly, the current drawn from the high voltage supply through the leads 14 rises until its value, as sensed by the coil 13 and the current sensing unit 15 reaches a predetermined value, for example 140% or 150% of the normal operational full speed load value, whereupon the current sensing unit 15 releases the relay 16 to the position shown in the drawing to cause the motor controller 17 to stop the motor 11. This in turn stops the scoop tube 10 which is then held stationary. Since the coupling has no leak-off nozzles, its degree of filling remains constant.

The movable relay contact 16A is resiliently biased into contact with a further fixed contact 16C to light an indicator L to indicate that the scoop tube is stationary.

The motor 1 then continues to drive the load 4 through the partially filled liquid working circuit W. The torque transmitted by the liquid in the working circuit W is sufficient to overcome the frictional forces represented by the brake 6 and to continue to accelerate the load 4 against its inertia (represented by the flywheel 5).

If the characteristics of the coupling 3 are such that as the speed rises, the torque transmitted by the coupling with this particular degree of filling also rises, then the motor 11 will remain de-energized and although the torque exerted by the motor will increase somewhat, the filling of the working circuit W will remain constant. When, as a result of increasing speed, the characteristics of the coupling cause the transmitted torque to fall below the predetermined value, then the current in the leads 14 will drop and be sensed by the current sensing unit which will cause the relay 16 to operate the motor control 17 to drive the scoop tube 10 further inwardly towards the axis and towards the "circuit full" position until the predetermined torque value is re-established. This "on-off" switching of the motor 11 continues until stopped by a conventional limit switch in the gear box 12 as the scoop tube 10 reaches its "circuit full" or normal operating position.

The motor 1 then continues to drive the load at normal speed. When the motor 1 is switched off to close down the system, a reversing switch 22 for the motor 11 intercharges two of its three AC3-phase connections and thus cause the motor 11 to drive the scoop tube away from the axis into the circuit empty position ready for the next time the motor 1 is started up.

I claim:

1. In a fluid coupling assembly comprising a variable filling fluid coupling, adjustable filling control means for controlling the degree of filling of the coupling by removing excess liquid therefrom, said filling control means providing the sole means of escape for liquid from the coupling under running conditions, torque-sensing means for sensing the driving torque of the fluid coupling, and controller means under the control of the torque-sensing means for (1) moving the filling control means to increase the filling of the coupling when the sensed torque falls below a predetermined value and (2) stopping the filling control means when the sensed torque exceeds said predetermined value to hold the degree of filling of said coupling constant until said sensed torque falls below said predetermined value, whereupon said torque sensing means operates said filling control means to allow the degree of filling of said coupling to increase.

2. A fluid coupling assembly according to claim 1, in which the filling control means comprise a movable trimming scoop, the position of the scoop in a rotary scoop chamber of the coupling determining the degree of filling of the coupling, and the filling control means including a motor drive connected to drive the scoop in a filling-increasing direction, said motor drive being under the control of the controller means.

3. A fluid coupling assembly according to claim 2 and including reversing means for the motor drive to cause the motor drive to return the scoop to a position in which the fluid coupling is empty on shut-down of the assembly.

4. A controlled acceleration driving system comprising an electric motor and a fluid coupling assembly according to claim 1, said motor being connected to the coupling to drive a load through the fluid coupling, the torque-sensing means comprising means responsive to current taken by said electric motor.

* * * * *